US009331872B2

(12) United States Patent
Emmadi et al.

(10) Patent No.: US 9,331,872 B2
(45) Date of Patent: May 3, 2016

(54) IMPLEMENTING PVLANS IN A LARGE-SCALE DISTRIBUTED VIRTUAL SWITCH

(75) Inventors: Vishnu Emmadi, San Jose, CA (US); Munish Mehta, Fremont, CA (US); Saravanakumar Rajendran, San Jose, CA (US); Prashant Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 13/477,605

(22) Filed: May 22, 2012

(65) Prior Publication Data

US 2013/0315252 A1      Nov. 28, 2013

(51) Int. Cl.
*H04L 12/64* (2006.01)
*H04L 12/46* (2006.01)
*H04L 29/06* (2006.01)
*H04W 4/02* (2009.01)
*H04W 12/08* (2009.01)

(52) U.S. Cl.
CPC ........ *H04L 12/6418* (2013.01); *H04L 12/4641* (2013.01); *H04L 63/0227* (2013.01); *H04L 63/0272* (2013.01); *H04L 63/107* (2013.01); *H04W 4/023* (2013.01); *H04W 12/08* (2013.01)

(58) Field of Classification Search
CPC .............. H04L 12/4641; H04L 12/467; H04L 12/4675; H04L 12/4679

USPC .............. 370/351, 389, 395.1, 396, 397, 398, 370/395.5, 395.53, 400, 407, 409

See application file for complete search history.

(56) References Cited

U.S. PATENT DOCUMENTS

| | | | |
|---|---|---|---|
| 8,170,033 B1 * | 5/2012 | Kothari et al. ........... | 370/395.53 |
| 8,213,336 B2 | 7/2012 | Smith et al. | |
| 8,705,526 B1 * | 4/2014 | Hasan ........................... | 370/389 |
| 8,798,059 B1 * | 8/2014 | Kommula et al. ............ | 370/392 |
| 2003/0131105 A1 * | 7/2003 | Czeiger et al. ............... | 709/225 |
| 2006/0146835 A1 * | 7/2006 | Homchaudhuri et al. ...................... | 370/395.53 |

(Continued)

OTHER PUBLICATIONS

Finnie, et al., "Notification of Transmittal of the International Search Report and the Written Opinion of the International Searching Authority, or the Declaration", Patent Cooperation Treaty, International Appl. No. PCT/US2013/042213, mailed Jul. 10, 2013, 11 pages, European Patent Office, Rijswijk, Netherlands.

*Primary Examiner* — Obaidul Huq
(74) *Attorney, Agent, or Firm* — Parker Ibrahim & Berg LLC; James M. Behmke; Stephen D. LeBarron

(57) ABSTRACT

In one embodiment, a list of source identifiers is maintained at a virtual switch. These source identifiers are allowed to send packets through the virtual switch to ports in a private virtual local area network (PVLAN). When a packet is received at the virtual switch from a particular source destined for a particular port in the PVLAN, the virtual switch determines whether a particular identifier associated with the particular source matches one of the source identifiers in the list. If that particular source identifier is not on the list, the packet is prevented from being forwarded to the particular port in the PVLAN.

14 Claims, 7 Drawing Sheets

(56) References Cited

U.S. PATENT DOCUMENTS

| | | |
|---|---|---|
| 2008/0002683 A1 | 1/2008 | Droux et al. |
| 2008/0163207 A1 | 7/2008 | Reumann et al. |
| 2010/0169880 A1 | 7/2010 | Haviv et al. |
| 2010/0293250 A1 | 11/2010 | Ankaiah et al. |
| 2011/0274110 A1 | 11/2011 | Mmmadi et al. |
| 2012/0176893 A1* | 7/2012 | Ghanwani et al. ............ 370/230 |
| 2012/0287936 A1* | 11/2012 | Biswas et al. .............. 370/395.3 |
| 2013/0077530 A1 | 3/2013 | Zhang et al. |
| 2013/0114612 A1 | 5/2013 | Singh et al. |

\* cited by examiner

IMPLEMENTING PVLANS IN A LARGE-SCALE DISTRIBUTED VIRTUAL SWITCH

TECHNICAL FIELD

The present disclosure relates generally to computer networks, and, more particularly, to private virtual local area networks (PVLANs).

BACKGROUND

PVLANs provide Layer 2 (L2) isolation within a single broadcast domain of a physical switch. A typical physical switch has a PVLAN promiscuous port and multiple isolated or community ports that belong to the same physical switch. Therefore enforcing a PVLAN isolation model among hosts connected to the physical switch may be achieved.

In a large-scale Distributed Virtual Switch (DVS), the switch scope spans across multiple physical hosts in a single L2 domain. For instance, traffic from a Virtual Machine (VM) may be processed by the virtual switch on a secondary Virtual Local Area Network (VLAN) and may be sent from a first server through its PVLAN promiscuous uplink port, which converts the secondary VLAN to a primary VLAN thereby terminating the PVLAN domain at the first server. When this packet reaches a second server in the DVS on the primary VLAN, the secondary VLAN information may have been lost. That is, once the secondary VLAN identifying information has been lost, this packet may be leaked to other PVLAN host ports.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a list of source identifiers is maintained at a virtual switch. These source identifiers are allowed to send packets through the virtual switch to ports in a private virtual local area network (PVLAN). When a packet is received at the virtual switch from a particular source destined for a particular port in the PVLAN, the virtual switch determines whether a particular identifier associated with the particular source matches one of the source identifiers in the list. If that particular source identifier is not on the list, the packet is prevented from being forwarded to the particular port in the PVLAN.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, and others.

Figure 1:
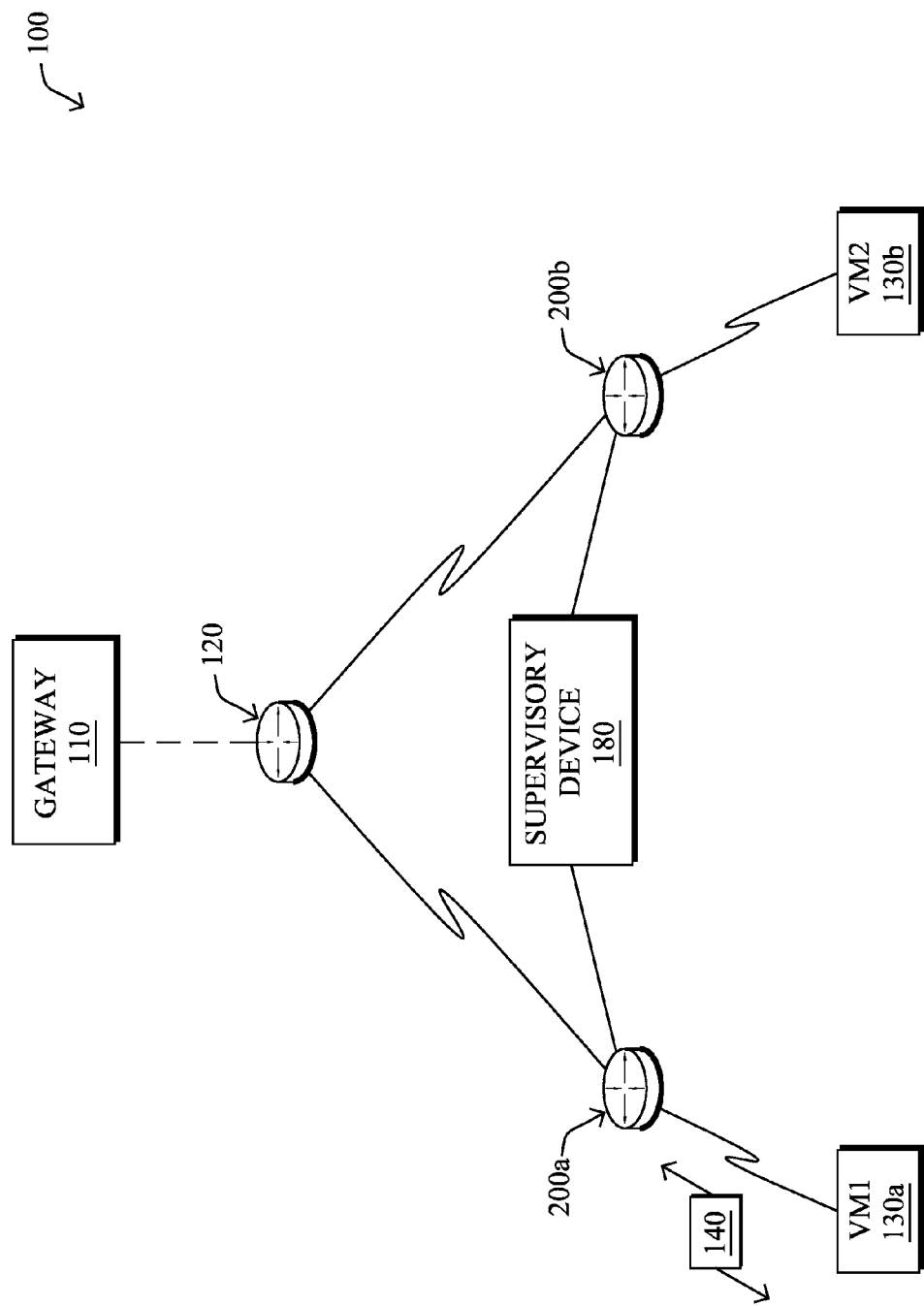
FIG. 1 illustrates an example communication network.

FIG. 1 is a schematic block diagram of an example computer network 100 in accordance with an illustrative embodiment illustratively comprising nodes/devices 200 that are interconnected by various methods of communication to one or more virtual machines (VMs) 130, as well as optionally an upstream node (e.g., switch) 120, which may be interconnected with a gateway server 110. Note also that as described below, one or more "supervisory devices" 180 may be in communication with at least the devices 200.

In the illustrative embodiment, the devices 200a-b, may be embodied as virtual switches that are installed on one or more physical servers (e.g., in a cluster of servers) as may be appreciated by those skilled in the art. That is, each of the virtual switches 200a-b in the network 100 may be installed on the same physical server of a plurality of physical servers in the network, or else on different physical servers within the network.

Generally, the links may be wired links or shared media (e.g., wireless links, etc.) where certain nodes 200, such as, e.g., switches, computers, servers etc., may be in communication with other nodes 200, e.g., based on physical connectivity, distance and/or signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), or other shared-media protocols where appropriate. In this context, a protocol consists of a set of rules defining how the nodes interact with each other.

Figure 2:
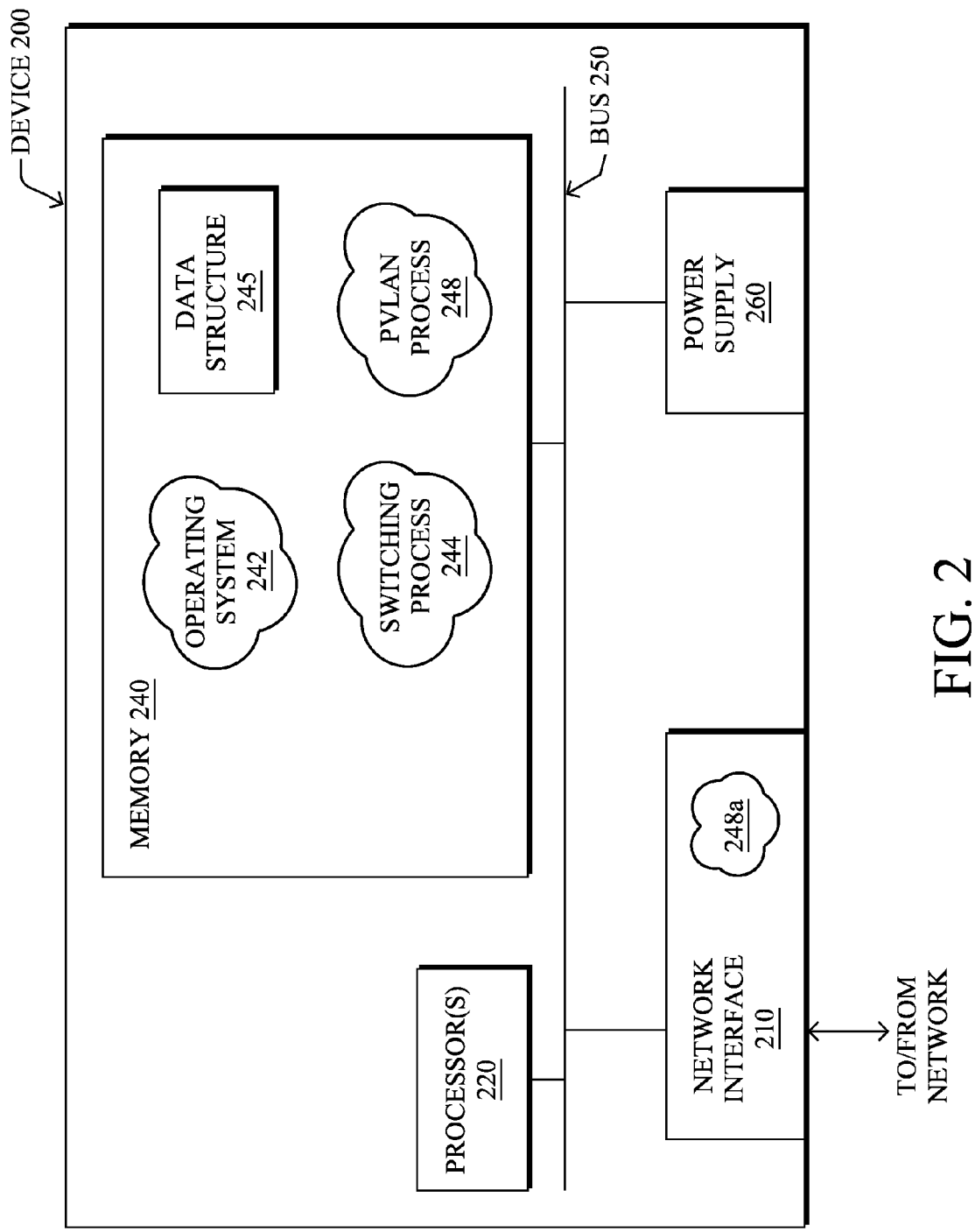
FIG. 2 illustrates an example network device/node.

FIG. 2 is a schematic block diagram of an example node/device 200 that may be used with one or more embodiments described herein, e.g., as any of the devices 200a-b shown in FIG. 1 above. The device may comprise one or more network interfaces 210 (e.g., wired, wireless, etc.), at least one processor 220, and a memory 240 interconnected by a system bus 250, as well as a power supply 260.

The network interface(s) 210 contain the mechanical, electrical, and signaling circuitry for communicating data over links coupled to the network 100. The network interfaces may be configured to transmit and/or receive data using a variety of different communication protocols. Note, further, that the devices may have a plurality of interfaces 210, which may or may not be of the same type of network connections, e.g., wireless and wired/physical connections, and that the view herein is merely for illustration. Also, while the network interface 210 is shown separately from power supply 260, for Power-line communication (PLC) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise switching process/services 244, and an illustrative private virtual LAN (PVLAN) process 248, as described herein. Note that while PVLAN process 248 is shown in centralized memory 240, alternative embodiments provide for the process to be specifically operated within the network interfaces 210 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Switching process 244 comprises computer executable instructions executed by the processor 220 to perform functions provided by one or more switching protocols, such as various L2 switching protocols as will be understood by those skilled in the art. These functions may be configured to manage a forwarding table (a data structure 245) containing, e.g., data used to make forwarding decisions.

As noted above, in a large-scale Distributed Virtual Switch (DVS), the DVS scope spans across multiple physical hosts in a single L2 domain. For instance, traffic from a particular Virtual Machine (VM) 130 may be processed by the virtual switch on a secondary Virtual Local Area Network (VLAN) and may be sent from a first server/switch through its PVLAN promiscuous uplink port, which converts the secondary VLAN to a primary VLAN thereby terminating the PVLAN domain at the first server. When this packet reaches a second server/switch in the DVS on the primary VLAN, the secondary VLAN information may have been lost. That is, once the secondary VLAN identifying information has been lost, this packet may be leaked to other PVLAN host ports.

Currently, a DVS may prevent information from being leaked by distributing a Media Access Control (MAC) address list of every PVLAN VM port (e.g., for VMs 130a and 130b) to every server in a cluster. These MAC entries are inserted into the primary VLAN's forwarding table. The secondary VLAN information is also contained within these MAC entries so that when a frame from a PVLAN VM host port on a first server (e.g., "A") reaches a second server (e.g., "B") on the primary VLAN, the source MAC address (identifier) is looked up on the primary VLAN forwarding table to determine whether or not that source MAC address is allowed to access that particular PVLAN VM port. The primary VLAN is then mapped to the appropriate secondary VLAN based on the information contained within the MAC entry. Once the mapping is resolved, all the PVLAN forwarding rules are enforced based on the secondary VLAN. For example, if the secondary VLAN is a community PVLAN, the frame is allowed to reach the VM ports that are part of that same community and dropped if it is destined to VM ports in a different community.

However, in the above approach, every MAC address of every PVLAN VM port is sent to every server in the cluster. Thus, scalability is problematic in large-scale distributed virtual switch (DVS) networks. That is, even if a server does not host a VM port in that particular PVLAN, it still receives a MAC address list for every PVLAN VM port, which is inefficient.

As an example, referring again to FIG. 1, the virtual machine 1 (VM1) 130a and the virtual machine 2 (VM2) 130b may be placed in an isolated PVLAN within a primary VLAN, and one or more uplink ports connected to the virtual switches 200a and 200b are designated as promiscuous ports that terminate the PVLAN domain of the virtual switches at the server level. In this example embodiment, a PVLAN paradigm dictates that VM1 and VM2 should not be able to communicate with each other. Instead, VM1 and VM2 are only allowed to communicate with the gateway server 110 on the primary VLAN or other non-PVLAN devices on the primary VLAN through the promiscuous uplink ports on the virtual switches 200a and 200b since they are a part of an isolated PVLAN.

When VM1 sends a packet on the isolated PVLAN, virtual switch 200a maps the isolated PLVAN to the primary VLAN and floods the packet to an upstream switch 120 on the primary VLAN. The upstream switch then floods the packet to virtual switch 200b. When the virtual switch 200b receives the packet on its promiscuous uplink port, the packet (e.g., packet 140) is then flooded to VM2, thereby breaking the PVLAN paradigm. Likewise, if VM1 and VM2 are placed in two community PVLANs, both corresponding to primary VLAN, traffic can also potentially leak across different communities from the upstream switch that is only part of the primary VLAN.

The technique herein, therefore, provide a system that is able to terminate PVLAN domains at a virtual switch/server within a cluster so that traffic from PVLAN host ports may still be seen on the primary VLAN in an upstream network. Furthermore, the techniques herein enforce the PVLAN paradigm across PVLAN host ports located on the same or different servers and virtual switches in the cluster. In particular, to the techniques herein provide for efficient scalability in a large-scale distributed switches, that is, for large numbers of PVLAN host ports. In other words, an illustrative embodiment according to the techniques herein provides a scalable and reliable technique for providing PVLAN semantics across various host ports of virtual machines in the same or different servers (i.e., that contain the virtual switches) of a cluster while at the same time terminating the PVLAN domain at each virtual switch/server when required.

More specifically, according to one or more embodiments of the disclosure as described in greater detail below, a list of source identifiers are maintained on each virtual switch in associated with a port in a PVLAN. The source identifiers on the listed indicate the sources that are allowed to send packets through that particular virtual switch to ports in the PVLAN. When a packet is received at the virtual switch from a particular source destined for a particular port in the PVLAN, the virtual switch determines whether a particular identifier associated with the particular source matches one of the source identifiers in the list. If that particular source identifier is not on the list, the packet is prevented from being forwarded to the particular port in the PVLAN. Furthermore, only those servers that own a port in a particular PVLAN store the list of source identifiers for the particular PVLAN, thus allowing for a more scalable distribution of source identifiers.

In particular, the illustrative embodiment provides a list of source identifiers that can be transmitted to a PVLAN host VM port in a distributed virtual switch (e.g., stored as a data structure 245). For isolated PVLANs, the source identifier list may include, for example, one or more MAC addresses of just the non-PVLAN devices on the Primary VLAN (e.g., for the gateway 110). On the other hand, a source identifier list for community PVLANs, may include, for example, one or more MAC address of the members of the community VLAN and those of the non-PVLAN devices on the Primary VLAN.

The techniques herein thus allow for optimized and efficient distribution of a source identifier list across multiple servers. Notably, however, the source identifier list is illustratively only sent to a virtual switch on a particular server if that particular virtual switch/server hosts a PVLAN host port in that particular PVLAN. Therefore, when packets are transmitted to that PVLAN host port, those packets from source identifier lists are allowed onto the PVLAN while those packets from anyone else are dropped at the virtual switch.

Illustratively, the techniques described herein may be performed by hardware, software, and/or firmware, such as in accordance with PVLAN process 248 (248a), which may contain computer executable instructions executed by the processor 220 (or independent processor of interfaces 210) to perform functions relating to the techniques described herein, e.g., in conjunction with switching process 244. For example, the techniques herein may be treated as extensions to conventional protocols, such as various distributed virtual switching protocols, and as such, may be processed by similar components understood in the art that execute those protocols, accordingly.

Operationally, according to the techniques herein, each server in a cluster may include at least one virtual switch that is associated with at least one PVLAN host port and may also include at least one or more network interface(s) 210 that may be configured to communicate in computer network as part of a (distributed) virtual switch. PVLAN process 248, when executed by the one or more processors 220, may be configured to maintain a list (e.g., a data structure 245) of source devices, i.e., "source identifiers" that are allowed to send packets through the virtual switch to ports in a private virtual local area network (PVLAN). Since the number of sources that are able to communicate with a PVLAN host tends to be a relatively small number of sources, the source identifiers on the list maintained by each virtual switch will be relatively small. As mentioned above, these source identifiers may be embodied as MAC addresses or any other identifier that is capable of uniquely identifying a source. The sources may be ports, virtual machines, or any other destination type node capable of receiving packets.

Furthermore, a PVLAN, to which a host VM port is associated, may be either an isolated or community PVLAN. In an isolated PVLAN, PVLAN host VM ports can only communicate with the non-PVLAN devices on the primary VLAN (e.g., the gateway server 110). Hence, when a packet is destined to a PVLAN host VM port (VM) in an isolated PVLAN, the packet can be forwarded if and only if the source identifier of the packet matches the source identifier of non-PVLAN devices.

On the other hand, when the PVLAN is a community PVLAN, the list of identifiers associated with community PVLAN list comprises one or more non-PVLAN devices on a primary VLAN for the PVLAN, and source identifiers of each port associated with that particular community PVLAN. Additionally, one or more non-PVLAN devices may be a gateway for the primary VLAN. Each community PVLAN host VM port can only communicate with other members of the same community and the non-PVLAN devices (e.g., gateway 110) on the primary VLAN. Hence, when the packet is destined to a VM host port in a community PVLAN, the packet can be forwarded if and only if the source identifier matches the source identifier of one of the non-PVLAN devices or one of the community members The techniques herein provide an optimized distribution of both isolated and community PVLAN source identifiers to make implementation of PVLANs into a distributed virtual switch network more scalable. For instance, if a particular server in a cluster does not host any PVLAN host ports that are part of a community or isolated PVLAN, then the list of source/destination identifiers associated with that isolated or community PVLAN need not be published to that server, thereby preventing servers from having to store source identifiers for PVLANs that do not have any ports on those servers.

Notably, programming of these lists on the servers/virtual switches may be controlled and maintained by one or more supervisory devices 180. Example supervisory devices 180 may comprise the gateway 110, the upstream switch 120, a standalone configuration device, a network management server (NMS), or other device able to communicate with and configure the servers/virtual switches 200.

In general, there are at least two types of source identifiers that may be included in the source identifier lists: non-PVLAN members and Community PVLAN members depending upon what kind of PVLAN the sources/destinations are associated with. Typically, non-PVLAN members include the gateway 110 on the Primary VLAN as well as any physical hosts on the primary VLAN that need to communicate with the isolated or community PVLAN host port VMs. Since the number of such devices that are deemed non-PVLAN members is typically very small, these source identifiers may be configured by an administrator on the supervisory device of the DVS. The supervisory device may then propagate this information to each of the virtual switch components in the servers that are associated with that PVLAN.

The supervisory device, however, is responsible for managing the "bring up/bring down" of the PVLAN host ports on each of the virtual switches that are within a community PVLAN. Thus, the supervisory device is responsible for maintaining a list of all the PVLAN Host VMs that are part of each community PVLAN and mapping of servers with at least one PVLAN host port belonging to each community PVLAN. For instance, a bitmap may be used to manage a list of all of the servers that own at least one host VM port on a particular PVLAN, as may be appreciated by those skilled in the art.

More specifically, when a new port on a server is added to a community PVLAN, the supervisory device obtains the list of source identifiers for all of the PVLAN host VMs that are a part of the community PVLAN and also obtains the bitmap of servers with at least one PVLAN host port belonging to each community PVLAN. The supervisory device then adds the new port to the list of source identifiers associated with that community PVLAN. Furthermore, when the server associated with the new port is not part of the bitmap of servers with at least one PVLAN host port belonging to that community PVLAN, the updated list of source identifiers for that community PVLAN is sent to the server associated with the new port and server is added to the bitmap for that particular community PVLAN. Finally, the updated list of identifiers associated with that community PVLAN is sent to all of the servers on the bitmap that correspond to that community PVLAN (generally except the new server since that server has already been updated).

Conversely, a port may be deleted from a community PVLAN as well by the supervisory device. In particular, in this instance, the supervisory device again obtains the list of source identifiers for all of PVLAN host VMs that are a part of that community PVLAN and also obtains the bitmap of servers with at least one PVLAN host port belonging to each community PVLAN. Then it deletes from the list of source identifiers associated with that particular community PVLAN the source identifier associated with that particular port and propagates the changes to all of the servers on the bitmap associated with that particular community PVLAN. Furthermore, if the server associated with the port no longer hosts any ports associated with that community PVLAN, then the list of source identifiers associated with that particular community PVLAN is removed from that server and the server is removed from the bitmap associated with that particular community PVLAN.

Ports may also be migrated from one server to another within the same network. This is essentially equivalent to deleting a port from a first server and adding the port to a second sever. Thus, in this case, the supervisory device sends an update to the first server indicating that the source identifier associated with the port is no longer local to the first server, and sends an update to the second server indicating that the source identifier of the port is now local to this server. Again, if no other ports on the first server are associated with the same community PLVANs as the port, the list of source identifiers for that particular community PVLAN is removed from the first server and the server is removed from the bitmap associated with that particular community PVLAN that the port is associated.

Likewise, if the second server has other ports associated with same community VLAN as the newly migrated port, the list of source identifiers on the second server is updated to include the source identifier of the newly migrated port. If, however, the second server does not have any other ports associated with the same community PVLAN as the newly migrated port, then a list of the source identifiers associated with that community PVLAN is sent to and stored on the second server and the second server is added to the bitmap associated with that particular community PVLAN.

When a new server, however, is added to the cluster, the supervisory device again obtains the list of source identifiers for all of PVLAN host VM ports that are a part of a community PVLAN and also obtains the bitmap of servers with at least one PVLAN host port belonging to each community PVLAN. The source identifiers of all of the PVLAN host VM ports on the newly added server are then added to the source identifier list of that community PVLAN and an updated source identifier list for that community PVLAN is sent to all of the other servers associated with that community PVLAN. If the newly added server contains at least one PVLAN host port associated with at least one community PVLAN, the new server is added to each of the bitmaps associated with a community PVLAN for which at least one port on the server is a member. The list of source identifiers for each community PVLAN that has at least one port on the server is then sent to that server.

Moreover, when a server is removed from a cluster, the supervisory device obtains the list of source identifiers for all of the PVLAN host VM ports that are a part of a community PVLAN and also obtains the bitmap of servers with at least one PVLAN host port belonging to each community PVLAN. The server is then removed from each bitmap of all of community PVLANs that the server was previously associated. Finally, each port on the server is deleted via the sequence discussed above, and the source identifier lists for each associated community PVLAN are updated accordingly within all of the remaining servers on the cluster.

An illustrative procedure for implementing the PVLANs in a large-scale distributed virtual switch will now be described with reference to FIG. 3.

Figure 3:
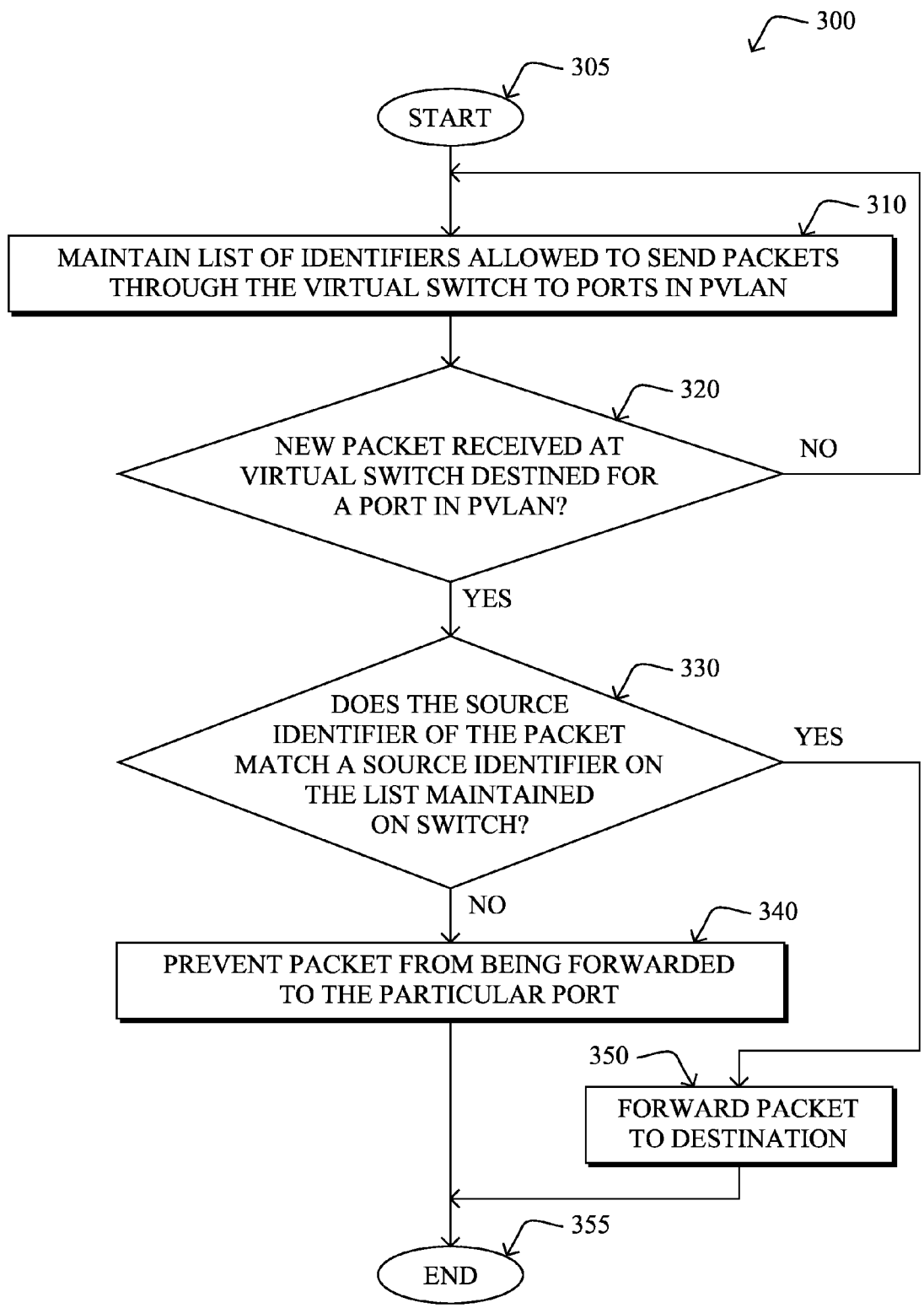
FIG. 3 illustrates an example procedure for implementing PVLANs in a large-scale distributed virtual switch.

In particular, FIG. 3 illustrates an example simplified procedure 300 for implementing PVLANs in a large-scale virtual switch in accordance with one or more embodiments described herein, specifically from the perspective of a virtual switch. The procedure 300 starts at step 305, and continues to step 310 where, as described in detail herein, the list of source identifiers is maintained at each virtual switch in the network. This list, as noted above, contains the source identifiers that are allowed to send packets through that particular virtual switch to a port of a virtual machine in the PVLAN.

Accordingly, when a virtual switch receives a packet from a particular source destined for a particular port in the PVLAN in step 320, the virtual switch makes a determination in step 330 as to whether a particular identifier associated with the particular source matches a source identifier in the list maintained on that particular virtual switch. When the source identifier matches one of the source identifiers on the list maintained on that virtual switch, the packet is forwarded on to its intended destination in the PVLAN in step 350. When, however, the source identifier associated with the particular source does not match one of the source identifiers on the list associated with that particular PVLAN, the packet is dropped and thus prevented from being forwarded to any of the ports in the PVLAN in step 340. The process illustratively ends at step 355, though notably with the option to return to step 310 or 320 to maintain the list of source identifiers or to receive additional packets, respectively.

It should be noted that while certain steps within simplified procedure 300 are shown and described above, the steps shown in FIG. 3 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques herein are further described with reference to FIGS. 4-7 showing example topologies and settings in which one or more illustrative embodiments may be applied.

Figure 4:
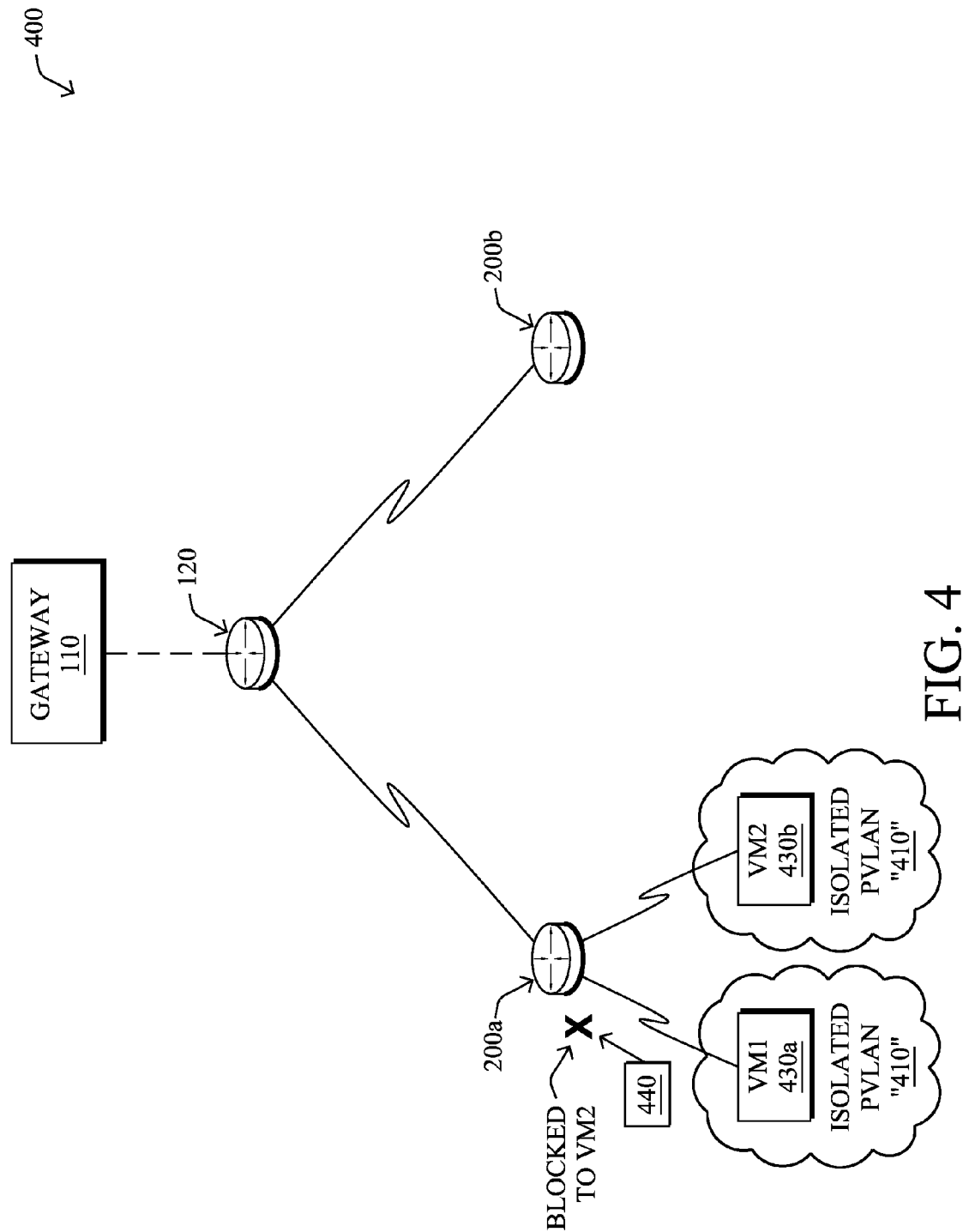
FIG. 4 illustrates an example isolated PVLAN configuration applied to the network in FIG. 1.
Figure 5:
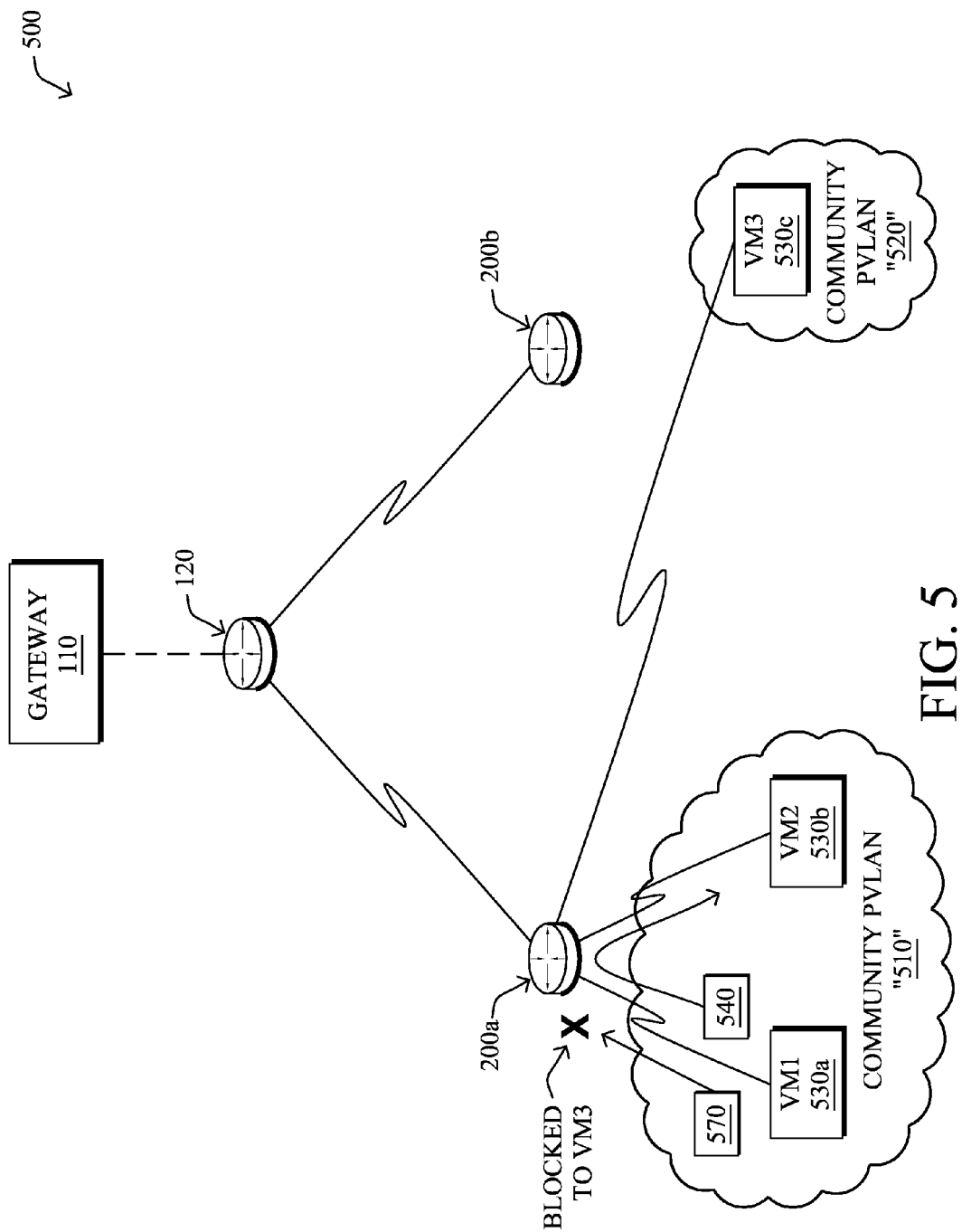
FIG. 5 illustrates an example community PVLAN configuration applied to the network in FIG. 1.

In particular, FIGS. 4-5 illustrate a scenario in which the source of a packet and the destination of packet are both on the same server.

More specifically, FIG. 4 illustrates one example embodiment in which a virtual machine 1 (VM1) 430*a* and virtual machine 2 (VM2) 430*b* may be designated within an isolated PVLAN 410 corresponding to primary VLAN 400. Both the VM1 430*a* and the VM2 430*b* may, though need not be, installed on the same physical server. Likewise, the virtual switch 200*a* may also optionally be installed on the same server as VM1 and VM2 in certain embodiments.

Furthermore in this example embodiment, virtual switch 200a may be programmed with a list of source identifiers associated with the isolated PVLAN 410. In this case, since the PVLAN 410 is isolated, the list of source identifiers in this example embodiment would only include the source identifiers (MAC address) associated with the gateway server 110 on the primary VLAN 400.

In this example, when VM1 sends a packet 440 destined to VM2, the virtual switch 200a processes the packet on the PVLAN 410. Since the destination (i.e., VM2) is in an isolated PVLAN, the virtual switch 200a checks whether the source identifier associated with VM2 matches one of the addresses in the list of source identifiers associated with isolated PVLAN 410. In this case, since VM2 is isolated from VM1, the source identifier, e.g., MAC address, of VM2 would not be on the list of source identifiers programmed on the virtual switch 200a. Thus, the packet 440 would be dropped and prevented from being forwarded to VM2 at virtual switch 200a.

FIG. 5 illustrates another example embodiment, in which a VM1 530a and a VM2 530b may be configured within a community PVLAN 510 corresponding to primary VLAN 500 and a VM3 530c may be in community PVLAN 520 corresponding to the same primary VLAN 500. Note that VM1, VM2, and VM3 may be installed on the same server, though this is not necessary.

In this case, virtual switch 200a may be programmed with a first list of source identifiers associated with the community PVLAN 510, where the first list of source identifiers would include the source identifiers of the gateway server 110 on primary VLAN 500, VM1's source identifier, and VM2's source identifier. Furthermore, the virtual switch 200a in this example embodiment would also be programmed with a second list of source identifiers associated with community PVLAN 520, which in this case would include the source identifier of the gateway server 110 of the primary VLAN 500 and the source identifier of VM3.

Thus, according to the illustrative embodiment, when VM1 sends a packet 540 destined for VM2, the virtual switch 200a processes the packet on the community PVLAN 510. Since the destination VM2 is part of the community PVLAN 510, the virtual switch 200a checks whether the source identifier is in the list of source identifiers associated with community PVLAN 510 by matching the source identifier of VM2 with the source identifiers on list of source identifiers associated with the community PVLAN 510. Since VM1 is indeed part of the list of source identifiers for community PVLAN 510, the packet 540 in this case would be forwarded to VM2.

When, however, in this example embodiment VM1 sends a packet 570 destined to VM3, the virtual switch 200a processes the packet on the PVLAN 520. Since the destination VM3 is part of the community PVLAN 520, the virtual switch 200a checks the second list of source identifiers associated with community PVLAN 520 to determine if the packet 570 can be sent to VM3. Since VM1 is not part of the second list of source identifiers for community PVLAN 520, the packet 570 is dropped at virtual switch 200a and is not forwarded to VM3.

Figure 6:
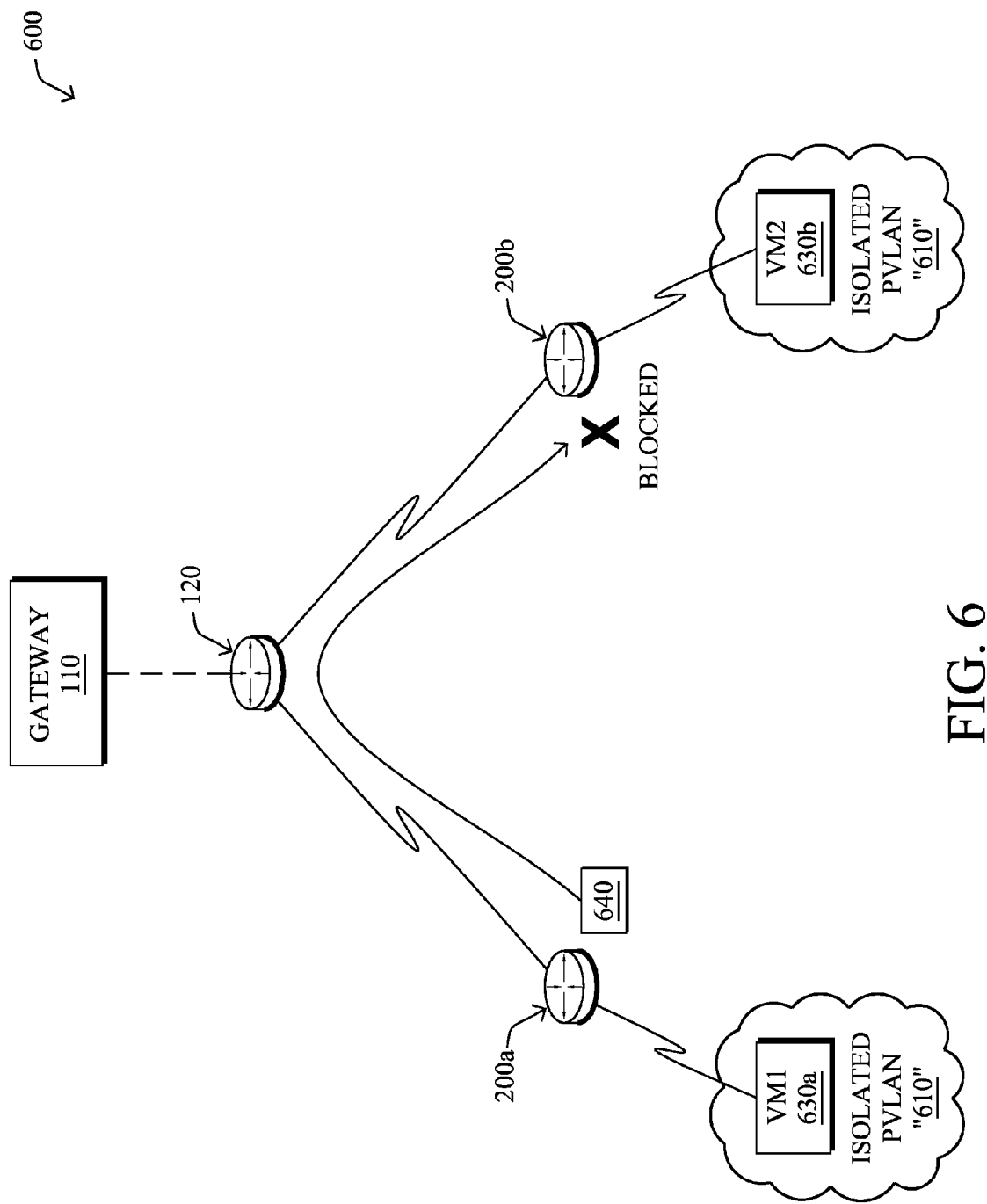
FIG. 6 illustrates an alternate example isolated PVLAN configuration applied to the network in FIG. 4.
Figure 7:
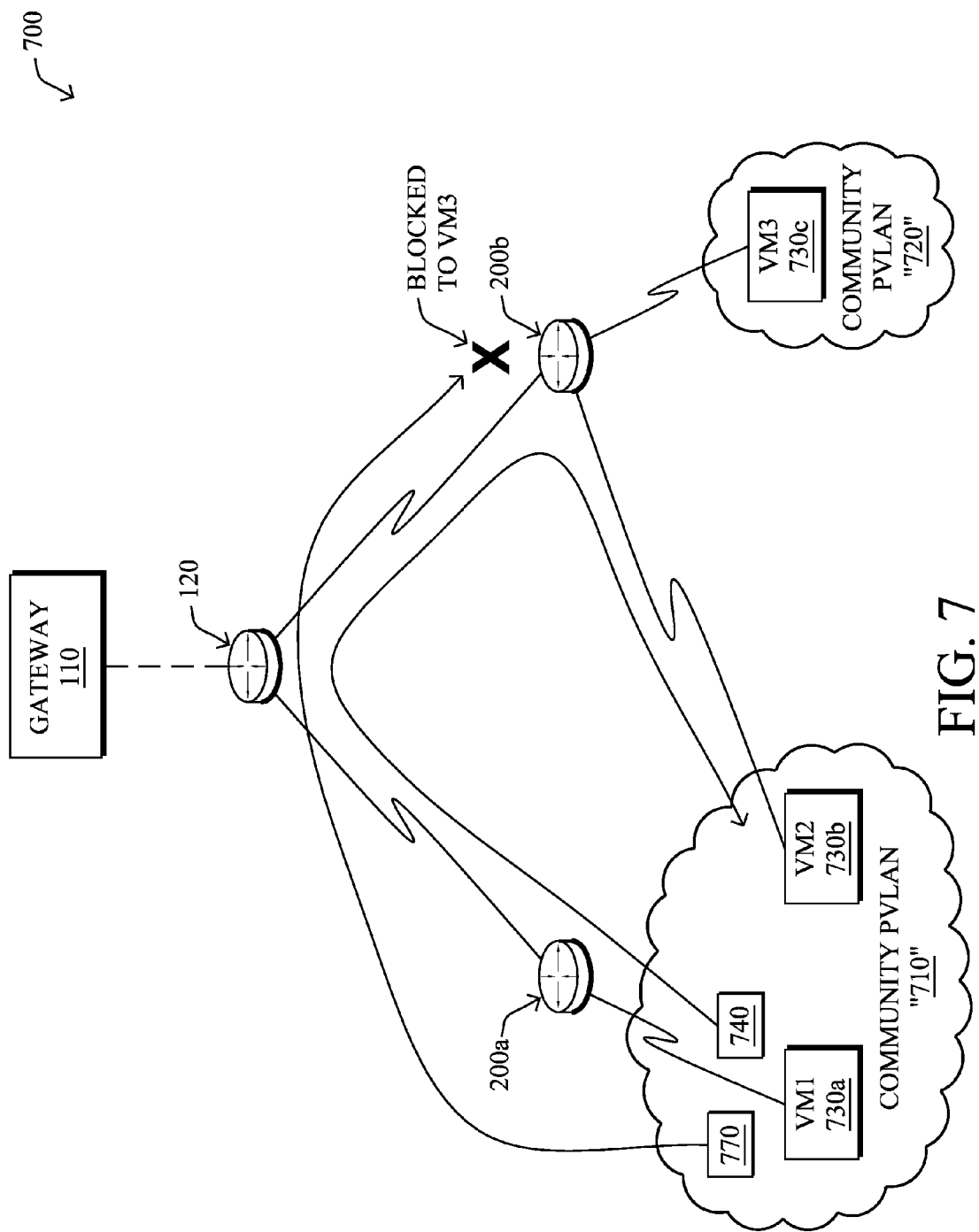
FIG. 7 illustrates an alternate example community PVLAN configuration applied to the network in FIG. 5.

Alternatively, FIGS. 6-7 illustrate two example embodiments that describe a situation in which the source of a packet and the destination of a packet are on different servers in a cluster.

More specifically, FIG. 6 illustrates an example in which a VM1 630a and a VM2 630b which are designated in an isolated PVLAN 610 corresponding to primary VLAN 600 and both VM1 and VM2 are connected to different servers, e.g., hosting virtual switches 200a and 200b. In this case, virtual switches 200a and 200b are both programmed with a list of source identifiers associated with isolated PVLAN 610. Again in this case, since the PVLAN 610 is isolated, the list of source identifiers in this example embodiment would only include the source identifiers associated with the gateway server 110 on the primary VLAN 600.

Accordingly, when VM1 sends a packet 640 destined for VM2, and the virtual switch 200a floods the packet 640 to the upstream switch 120 on the primary VLAN 600, the upstream switch then floods the packet to virtual switch 200b on server 660. The virtual switch 200b then processes the packet 640 on VLAN 600 to determine if the packet 640 may be sent on to its destination VM2. Accordingly, VM2 checks the list of source identifiers that are associated with the isolated PVLAN 610 and determines whether the source identifier (e.g., VM1) is on the list of source identifiers. Since, the source identifier of VM1 would not be on the list of source identifiers, the packet 640 in this case would be dropped (blocked) at virtual switch 200b.

FIG. 7 illustrates another example embodiment in which a VM1 730a and a VM2 730b may be within in a community PVLAN 710 corresponding to primary VLAN 700 and a VM3 730c may be in community PVLAN 720 corresponding to the same primary VLAN 700. In this embodiment, it is assumed that at VM1 is in communication with a first server (virtual switch 200a) and VM2 and VM3 are in communication with a different server (virtual switch 200b). However, VM2 and VM3 may also be installed on different servers as well.

In this example embodiment, virtual switches 200a and 200b are both programmed with a first list of source identifiers associated with the community PVLAN 710. In this case, the first list of source identifiers would include the source identifiers of the gateway server 110 on primary VLAN 700, VM1's source identifier, and VM2's source identifier. Furthermore, both virtual switches 200a and 200b in this example embodiment would also be programmed with a second list of source identifiers associated with community PVLAN 720, which in this case would include the source identifier of the gateway server of the primary VLAN 700 and the source identifier of VM3.

Accordingly, when VM1 sends a packet 740 destined to VM2, virtual switch 200a again floods the packet 740 to the upstream switch 120 on the primary VLAN 700 and the upstream switch 120 forwards the packet 740 to virtual switch 200b on server. The virtual switch 200b processes the packet 740 on the primary VLAN 700 and since the destination, VM2, is part of community PVLAN 710, the virtual switch 200b determines whether the source identifier (VM1) is on the first list of source identifiers that is associated with community PVLAN 710. In this case, since the source identifier associated with VM1 is indeed on the list of source identifiers associated with community PVLAN 710, the virtual switch 200b allows the packet 740 to be forwarded to VM2.

However, when VM1 sends a packet 770 destined to VM3, virtual switch 200a again floods the packet 770 to the upstream switch 120 on the primary VLAN 700 and the upstream switch 120 forwards the packet 770 to virtual switch 200b on server. The virtual switch 200b processes the packet 770 on the primary VLAN 700 and since the destination, VM3, is part of community PVLAN 720, the virtual switch 200b determines whether the source identifier (VM1) is on the second list of source identifiers that is associated with community PVLAN 720. In this case, since the source identifier for VM1 is not on the list of source identifiers associated with community PVLAN 720, the packet 770 is dropped at virtual switch 200b.

The techniques described herein, therefore, provide for efficient implementation of PVLANs in a large-scale distributed virtual switch, specifically by providing a scalable technique that does not require every server in the cluster to receive every PVLAN host VM port identifier, unlike previous solutions that distribute every PVLAN host VM port to every server in the cluster. In particular, when a PVLAN host port is an isolated PVLAN host port, each server stores a source identifier, e.g., MAC address, of just the non-PVLAN devices in the primary VLAN. For community PVLAN host ports, however, each server stores only the source identifiers of PVLANs of particular PVLAN host ports that are a members of those PVLANs. That is, if a server/device does not host any community PVLAN host VM ports, that particular server does not store the source identifiers of any of the community members, thus improving scalability and storage efficiency across the entire DVS.

While there have been shown and described illustrative embodiments that provide for implementing PVLANs in a large-scale distributed virtual switch, it is to be understood that various other adaptations and modifications may be made within the spirit and scope of the embodiments herein. For example, the embodiments have been shown and described herein with relation to particular network configurations between particular types of devices. However, the embodiments in their broader sense are not as limited, and may, in fact, be used with other types of distributed virtual switch architectures. In addition, while certain protocols may have been illustrated or implied, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a virtual switch, a list of source identifiers from a supervisory device, the virtual switch receiving the list of source identifiers only if the virtual switch hosts a private virtual local area network (PVLAN) promiscuous port in that particular PVLAN, wherein:
when the PVLAN is an isolated PVLAN, the list of source identifiers includes one or more non-PVLAN devices on a primary virtual local area network (VLAN) for the PVLAN, and
when the PVLAN is a community PVLAN, the list includes one or more non-PVLAN devices on a primary VLAN for the PVLAN, and identifiers of each port associated with the community PVLAN;
maintaining, at the virtual switch, a list of source identifiers that are allowed to send packets through the virtual switch to ports in the PVLAN, wherein the source identifiers on the maintained list indicate source devices that are allowed to send packets through the virtual switch to the ports in the PVLAN;
receiving a packet at the virtual switch from a particular source destined for a particular port in the PVLAN;
determining whether a particular identifier associated with the particular source matches one of the source identifiers in the list; and
preventing the packet from being forwarded to the particular port in the PVLAN when the particular identifier is not in the list.

2. The method of claim 1, wherein the one or more non-PVLAN devices is a gateway for the primary VLAN.

3. The method of claim 1, wherein the virtual switch is on a server of a plurality of servers, and wherein only those servers with ports in the community PVLAN store the identifiers of each port associated with the community PVLAN.

4. The method of claim 1, wherein one or more of the ports in the PVLAN are host VM ports.

5. The method of claim 1, wherein the identifiers are media access control (MAC) addresses.

6. An apparatus, comprising:
one or more network interfaces to communicate in computer network as part of a virtual switch;
a processor coupled to the network interfaces and adapted to execute one or more processes; and
a memory configured to store a process executable by the processor, the process when executed operable to:
receive from a supervisory device in the computer network a list of source identifiers, the virtual switch receiving the list of source identifiers only if the virtual switch hosts a private virtual local area network (PVLAN) host port in that particular PVLAN, wherein:
when the PVLAN is an isolated PVLAN, the list of source identifiers includes one or more non-PVLAN devices on a primary virtual local area network (VLAN) for the PVLAN, and
when the PVLAN is a community PVLAN, the list includes one or more non-PVLAN devices on a primary VLAN for the PVLAN, and identifiers of each port associated with the community PVLAN;
maintain a list of source identifiers that are allowed to send packets through the virtual switch to ports the PVLAN, wherein the source identifiers on the maintained list indicate source devices that are allowed to send packets through that the virtual switch to the ports in the PVLAN;
receive a packet from a particular source destined for a particular port in the PVLAN;
determine whether a particular identifier associated with the particular source matches one of the source identifiers in the list; and
prevent the packet from being forwarded to the particular port in the PVLAN when the particular identifier is not in the list.

7. The apparatus of claim 6, wherein, when the PVLAN is an isolated PVLAN, the one or more non-PVLAN devices is a gateway for the primary VLAN.

8. The apparatus of claim 6, wherein, when the PVLAN is a community PVLAN, the virtual switch is on a server of a plurality of servers, and wherein only those servers with ports in the community PVLAN store the identifiers of each port associated with the community PVLAN.

9. The apparatus of claim 6, wherein one or more of the ports in the PVLAN are host VM ports.

10. The apparatus of claim 6, wherein the identifiers are media access control (MAC addresses.

11. A tangible, non-transitory, computer-readable media having software instructions thereon, the software instructions, when executed by a processor on a device in a computer network configured to operate as part of a virtual switch, operable to:

receive from a supervisory device in the computer network a list of source identifiers, the virtual switch receiving the list of source identifiers only if the virtual switch hosts a private virtual local area network (PVLAN) host port in that particular PVLAN, wherein:

when the PVLAN is an isolated PVLAN, the list of source identifiers includes one or more non-PVLAN devices on a primary virtual local area network (VLAN) for the PVLAN, and when the PVLAN is a community PVLAN, the list includes one or more non-PVLAN devices on a primary VLAN for the PVLAN, and identifiers of each port associated with the community PVLAN;

maintain a list of source identifiers that are allowed to send packets through the virtual switch to ports in the PVLAN, wherein the source identifiers on the maintained list indicate source devices that are allowed to send packets through that particular virtual switch to the ports in the PVLAN;

receive a packet from a particular source destined for a particular port in the PVLAN;

determine whether a particular identifier associated with the particular source matches one of the source identifiers in the list; and prevent the packet from being forwarded to the particular port in the PVLAN when the particular identifier is not in the list.

12. The method of claim 11, wherein the virtual switch is on a server of a plurality of servers, and wherein when the PVLAN is a community PVLAN, only those servers with ports in the community PVLAN store the identifiers of each port associated with the community PVLAN.

13. The tangible, non-transitory, computer-readable media of claim 11, wherein one or more of the ports in the PVLAN are host VM ports.

14. The tangible, non-transitory, computer-readable media of claim 11, wherein the identifiers are media access control (MAC) addresses.

* * * * *